United States Patent
Zhao et al.

(10) Patent No.: US 9,410,340 B2
(45) Date of Patent: Aug. 9, 2016

(54) PLATED TRANSITION PIECE

(71) Applicant: Offshore Design Engineering Ltd., London (GB)

(72) Inventors: Wangwen Zhao, London (GB); Stephen Stuart-Matthews, London (GB)

(73) Assignee: OFFSHORE DESIGN ENGINEERING LTD., London (GB)

( * ) Notice: Subject to any disclaimer, the term of this patent is extended or adjusted under 35 U.S.C. 154(b) by 0 days.

(21) Appl. No.: 14/420,149

(22) PCT Filed: Sep. 10, 2013

(86) PCT No.: PCT/GB2013/052364
§ 371 (c)(1),
(2) Date: Feb. 6, 2015

(87) PCT Pub. No.: WO2014/027212
PCT Pub. Date: Feb. 20, 2014

(65) Prior Publication Data
US 2015/0204101 A1     Jul. 23, 2015

(30) Foreign Application Priority Data
Aug. 13, 2012  (GB) .................................. 201214381

(51) Int. Cl.
*E04H 12/34*  (2006.01)
*E04H 12/22*  (2006.01)
(Continued)

(52) U.S. Cl.
CPC ............ *E04H 12/22* (2013.01); *E02B 17/0004* (2013.01); *E02B 17/027* (2013.01);
(Continued)

(58) Field of Classification Search
CPC ......... E04H 12/00; E04H 12/20; E04H 12/22; E04H 12/34; E02B 2017/006; E04B 2017/0091; E04B 1/40; Y02E 10/727; Y02E 10/728; F05B 2240/95; F05D 11/045; F16M 2200/08; F16M 13/00; F16M 11/32
USPC ................ 52/40, 170, 169.13, 301, 831, 832; 248/163.1, 188.8
See application file for complete search history.

(56) References Cited

U.S. PATENT DOCUMENTS

| | | | | |
|---|---|---|---|---|
| 1,722,352 A | * | 7/1929 | Rawley | ............... E04H 12/2253 52/152 |
| 3,332,132 A | * | 7/1967 | Johnson | .................. E04H 12/34 29/897.33 |
| 3,371,458 A | * | 3/1968 | Sturgill | ................... E04H 12/10 182/178.5 |

(Continued)

FOREIGN PATENT DOCUMENTS

| | | |
|---|---|---|
| EP | 1813808 A2 | 8/2007 |
| EP | 2072685 A1 | 6/2009 |

(Continued)

OTHER PUBLICATIONS

ISR and W/O of International Application No. PCT/GB2013/052364 dated Jan. 23, 2014 (12 pgs.).

*Primary Examiner* — Phi A
(74) *Attorney, Agent, or Firm* — Christopher R. Carroll; The Small Patent Law Group LLC

(57) ABSTRACT

A structural entity for transferring structural loads from a Tower of a Wind Turbine Generator to its Foundation, by means of a Plated Transition Piece characterized in that it consists of a cylindrical central body connected by a series of inclined plates and shear plates and beams to legs that connects to a foundation structure.

9 Claims, 6 Drawing Sheets

(51) Int. Cl.
    *E02B 17/00*      (2006.01)
    *E02B 17/02*      (2006.01)
    *F03D 11/04*      (2006.01)
    *E04B 1/41*       (2006.01)

(52) U.S. Cl.
    CPC .............. *E04B 1/40* (2013.01); *F03D 11/045* (2013.01); *E02B 2017/006* (2013.01); *E02B 2017/0091* (2013.01); *E04H 12/34* (2013.01); *F05B 2240/9121* (2013.01); *F05B 2240/95* (2013.01); *Y02E 10/727* (2013.01); *Y02E 10/728* (2013.01)

(56) References Cited

U.S. PATENT DOCUMENTS

| | | | | |
|---|---|---|---|---|
| 5,051,037 | A * | 9/1991 | Haney | E02B 17/027 405/203 |
| 8,056,298 | B2 * | 11/2011 | Haugsoen et al. | 52/651.09 |
| 8,141,309 | B2 * | 3/2012 | Kubicek | 52/301 |
| 8,245,458 | B2 * | 8/2012 | Johnson | E04H 12/347 52/146 |
| 8,544,214 | B2 * | 10/2013 | Bagepalli et al. | 52/40 |
| 8,607,508 | B2 * | 12/2013 | Foss | 52/40 |
| 8,733,045 | B2 * | 5/2014 | Zavitz et al. | 52/296 |
| 8,839,515 | B2 * | 9/2014 | Lebon et al. | 29/889 |
| 2004/0051021 | A1 * | 3/2004 | Micheel | G10D 13/026 248/346.01 |
| 2005/0028478 | A1 * | 2/2005 | Kondo et al. | 52/720.1 |
| 2008/0028715 | A1 | 2/2008 | Foss | |
| 2011/0146192 | A1 | 6/2011 | Foss | |
| 2012/0228442 | A1 * | 9/2012 | Clifton | H02S 20/00 248/163.1 |
| 2013/0227897 | A1 * | 9/2013 | Palmer | E02D 27/42 52/157 |

FOREIGN PATENT DOCUMENTS

| | | |
|---|---|---|
| EP | 2290237 A2 | 3/2011 |
| EP | 2647764 A1 | 10/2013 |
| WO | 2012165969 A1 | 12/2012 |

* cited by examiner

PLATED TRANSITION PIECE

CROSS-REFERENCE TO RELATED APPLICATIONS

This application claims priority to and is a national stage entry of PCT International Application Number PCT/GB2013/052364, filed on 10 Sep. 2013, which claims priority to Great Britain application GB201214381, filed on 13 Aug. 2012, the entire disclosures of which are incorporated by reference herein in their entirety.

DESCRIPTION

The invention relates to a structural entity, called transition piece, for transferring loads between a base structure (normally a jacket) and a tower (1) with equipment or similar at the top, often a wind turbine generating unit, as found in the off-shore wind turbine industry, where use of jacket mounted wind-turbine towers (1) is prevalent.

The structural system for offshore wind turbine can be broken into several zones: tower (1), transition piece, jacket substructure as noted in FIG. 1. Each of these zones have unique features and design variations.

The tower (1), to which equipment such as a wind turbine is attached, is designed to transfer the differing wind loads downwards, providing appropriate dynamic stiffness. The jacket is normally anchored by means of piles or suction cans to the seabed and the tower (1) and jacket are connected by a Transition Piece. Such application could also be found in tall land based wind turbines.

For the design of the wind turbine structure system, the structural integrity has to meet criteria in the following conditions or limit states:

Service limit state i.e. Natural frequency requirement to be within a band not to resonate with the turbine system Fatigue limit state for the endurance limit of each component within the operational period under repetitive loads from wind/wave/turbine system Ultimate limit state for resisting extreme loads The tower (1) and the jacket are normally fabricated in different locations and are also generally designed independently initially and then analyzed as a total system at a later project design stage with the transition piece in place. For the jacket, a typical structural configuration is diamond bracing. For the tower (1), it is normally in a tubular form with thickness changes to suit along the length. While there are conventional methods to follow for the design of jacket and the tower (1), the transition piece design is less than straight forward.

The Transition Piece must transfer all forces from the tower (1) to the jacket substructure, i.e. from the large tubular column of the tower (1), to the legs (2) of the jacket in the most efficient manner possible. These loads from the tower (1) include load from the operating turbine under extreme wind and cyclic load from the actions of turbine and wind turbulence. The design of the transition piece must be made to not only transfer the extreme load without failure in the ultimate limit state but also to transfer normal operating load without fatigue failure in the fatigue limit state. The forces transmitted through the tower (1) are cyclic and repetitive in nature and can cause fatigue in areas of stress concentration.

Transition piece design must not attract high stress concentrations at key structural locations. However, because of the change of geometric forms from the tower (1) to jacket, there are areas of stress concentration within the transition piece. Current methods for connecting the Jacket substructure to the Tower consist of a variety of structural forms that include welded steel plates, braces, castings and tubular or oval members, or a combination of all. These Transition Pieces are often in complex structural forms which can attract high stress concentration at key structural locations, thereby limiting their fatigue life and these have led to design which are heavy and expensive to fabricate.

Cost Reduction for the Offshore Wind Turbine Foundation

The offshore renewable energy industry is facing many challenges, the greatest being cost which has increased steadily over the last decade. This increase is linked to multiple factors but significantly include supply chain constraints and volatility in the price of natural resources.

Cost optimization is essential in ensuring the growth of offshore wind power generation to help meet renewable energy generation targets. The growth of the sector has presented many engineering challenges with planned windfarms in increasing water depths and distances from shore resulting in even higher costs.

One of the key factors affecting cost for future costs of wind farms are the foundations (structure system including piles) which can account for c. 25% of the overall cost. Therefore reducing the cost of foundations and the installation could have a significant impact on overall cost.

The Transition Piece is a key element of a wind turbine support system and limitations of conventional designs include:

Heavy weight

Complex castings required to achieve load transfer efficiency and meet acceptable fatigue life criteria Complexity of fabrication The need for specialist fabricators limiting supply chain options This invention will provide a form of transition piece which solves these limitations and will help reduce the cost of wind turbine support structures.

SUMMARY

Alternative Solution for the Transition Piece

An alternative solution to the traditional transition piece is the main aim of this invention by providing a structural connection between a wind-turbine tower (1) and a support structure. It is to provide a solution of a type that can be economically made by conventional fabrication methods which will be relatively light and which will overcome the limitations mentioned in the last section.

Accordingly, this invention provides for a Plated Tower Transition Piece, characterized in that structural members are used efficiently with optimal configuration providing a reduction in local stress concentrations at hot spots, especially the end points of the plate connection, where stress concentrations occur and thus is prone to fatigue.

Several measures are to be used for the reduction of high stress concentrations, which include:

1. The structure is specifically formed to minimize forces at the members and stress concentration points,
2. An inclined plate (3) is welded to the face of the central column in an inclined angle on one end, and welded to a leg (2) on the other end,
3. The inclined plate (3) is shaped to reduce stresses,
4. The inclined plate (3) is connected with a centrally aligned shear plate (4).
5. The connection between the inclined plate (3 and the leg tubular (2) can be either in the form of a through inclined plate-leg connection or attached to the underside of the inclined plate surface, normally by welding.

6. Internal rings on the tower (1) on the back of the interface of the inclined plate (3) can be optionally used to relieve stresses.

7. The relief of high fatigue stresses at the sharp end of the inclined plate (3) between the inclined plate (3) and the central column.

Stress relief at the end of the plate (3), i.e. the high stress concentration point, will be achieved by one of combination of the following means:

a) The end of the inclined plate (3) can be extended to include a Stress Relieving Wing (5) which is in the form of part of a tubular, or curved or plate b) The end with the Stress Relieving Wing (5) can lie approximately at the neutral axis position of the combined section of the inclined plate (3), shear plate (4) and the Stress Relieving Wing (5) for the bending in the plane of the shear plate (4).

c) The ends of the inclined plate (3) with or without the Stress Relieving Wing (5) can be further fitted with Stress Spreaders (5) to reduce the hot spot stresses.

Such structural arrangement has two pronounced features 1) easy fabrication 2) high fatigue strength from reduced stress from a combination of load transfer and utilization of local Stress Spreaders (5) and Stress Relieving Wing (5) detail 3) weight reduction by avoiding increase of the dimensions of the connecting plates or central column.

EMBODIMENT 1

In one embodiment of a Plated Tower Transition Piece shown in FIG. 2, the inclined plate (3) and the shear plate (4) are welded to the central column. The fatigue strength and the ultimate strength requirement are satisfied by adjusting the thickness of the plates, the geometry of the central column and optionally the internal ring stiffeners. As in FIG. 2, the deck is formed by an external ring on the central column, which is connected by the combined section of plate/beam to the jacket leg (2) to offer an optimal and effective system to resist remaining loading from the central column.

EMBODIMENT 2

An optimization of Embodiment 1 can be made to reduce weight and cost. In another embodiment of a Plated Tower Transition Piece shown in FIG. 3, the inclined plate (3) is welded with a stress spreader (5) at the end enabling the shear plates (4) to reduce material and to offer a larger opening in the lower parts to provide personnel access.

EMBODIMENT 3

Alternative to Embodiment 2, a Plated Tower Transition Piece is shown in FIGS. 6, 7a and 7b, in which the inclined plate (3) has Stress Relieving Wings (5) fitted, in the form of a partial tubular, curved or flat plate section at the end. The ends of the Stress Relieving Wings (5) could lie near the horizontal neutral axis location of the inclined plate/shear plate cross section, so that stress from bending moments in the plane of the shear plate (4) are minimized.

EMBODIMENT 4

The end of the Stress Relieving Wings can also be fitted with Stress Spreaders.

EMBODIMENT 5

The Stress Spreader (5) as shown in FIGS. 4 and 5 is to be installed to the end of the inclined plate (3) and/or shear plates (4) or at anywhere there is a stress concentration. This enables a large opening in the shear plate (4) to be incorporated whilst maintaining adequate fatigue life performance for facilitating entry of ducting, services, equipment and personnel access into the tower (1)/deck void with due consideration of fatigue strength.

By such means, it is possible to transfer all loads including shear, bending and torque effectively through the combination of plates, tubular members, Stress Spreaders, and Stress Relieving Wings. It provides an effective and flexible means to solve the stress concentration problem which is prevalent in fatigue design for plated connections.

The embodiments of the invention will be described by way of example and with reference to the accompanying drawings in which:

FIG. 1 shows the general view and structural zones of a wind tower system;

FIG. (2) shows a general view of the Plated Transition Piece;

Figure 1:
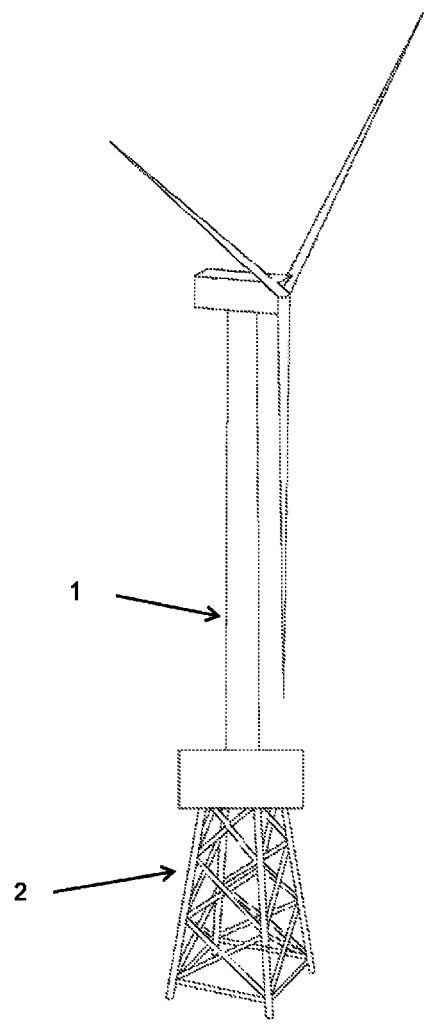
Figure 2:
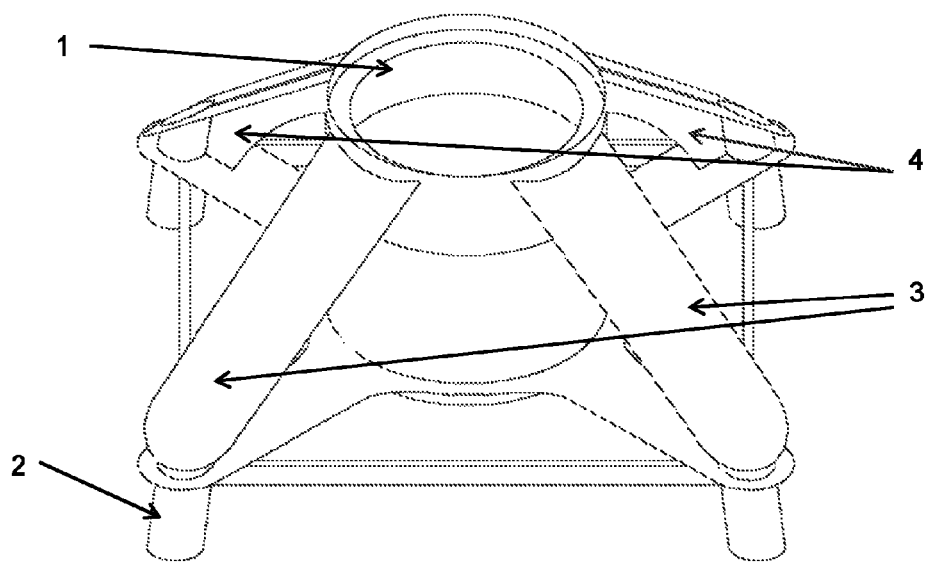
Figure 4:
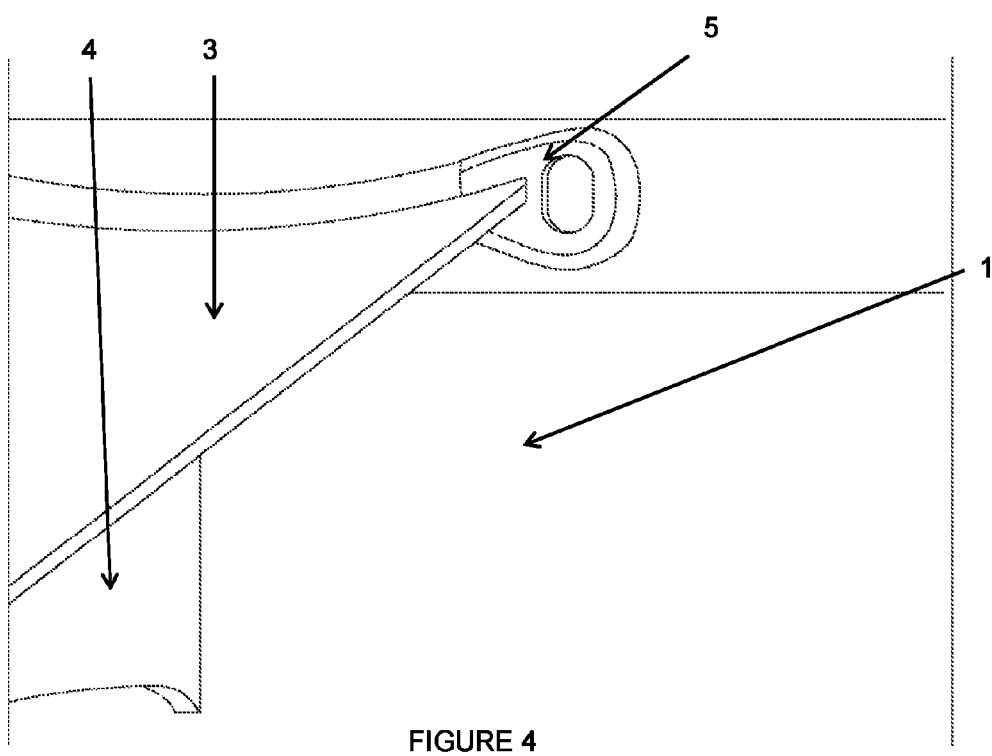
FIG. 4 shows a close view of the Stress Spreaders (5)
Figure 3:
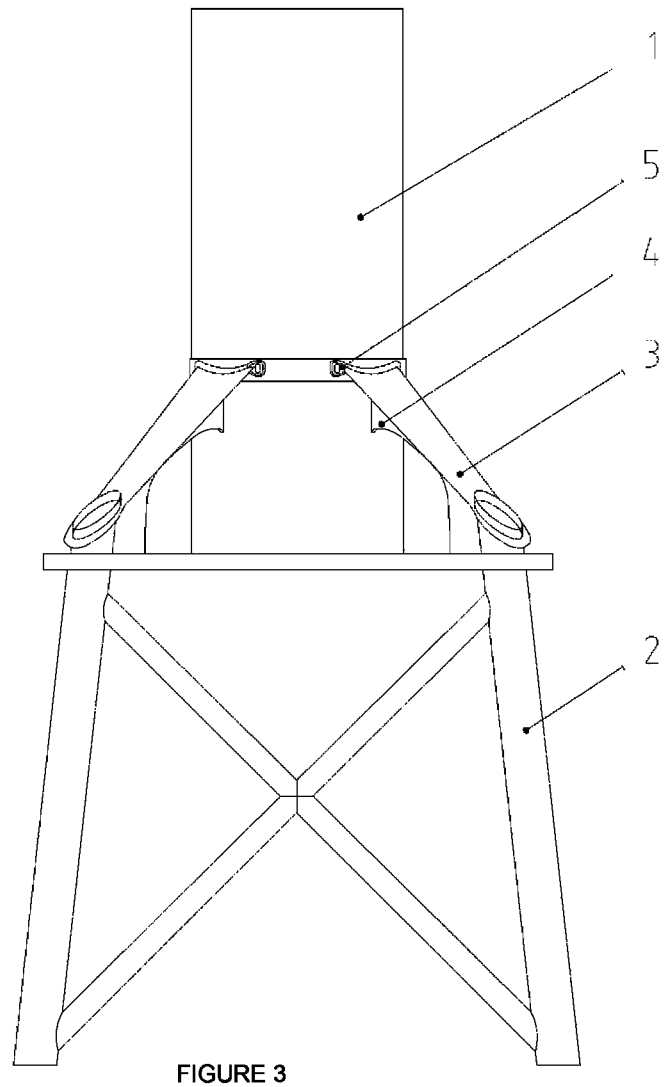
FIG. 3 shows a general external view of a Plated Transition Piece with the jacket, tower (1) and Stress Spreaders (5) attached to the inclined plate and central column.
Figure 5:
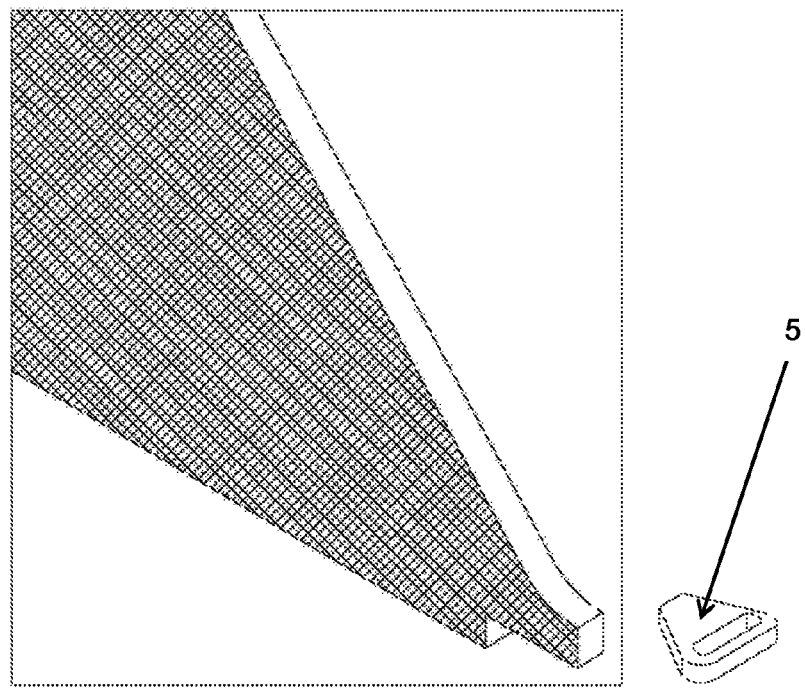
FIG. 5 shows an exploded view of the Stress Spreader and with a generalized tapered gusset plate.
Figure 6:
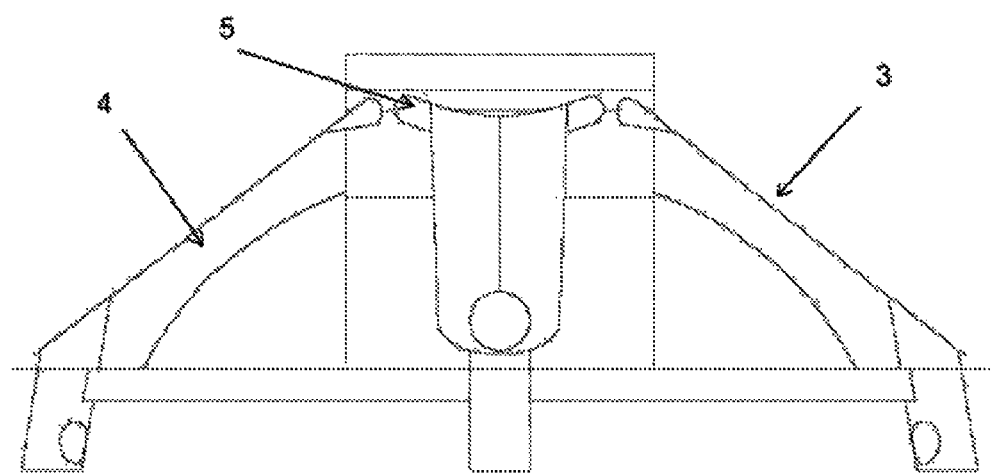
FIG. 6 shows the inclined plate with Stress Relieving Wings (5) fitted.
Figure 7A:
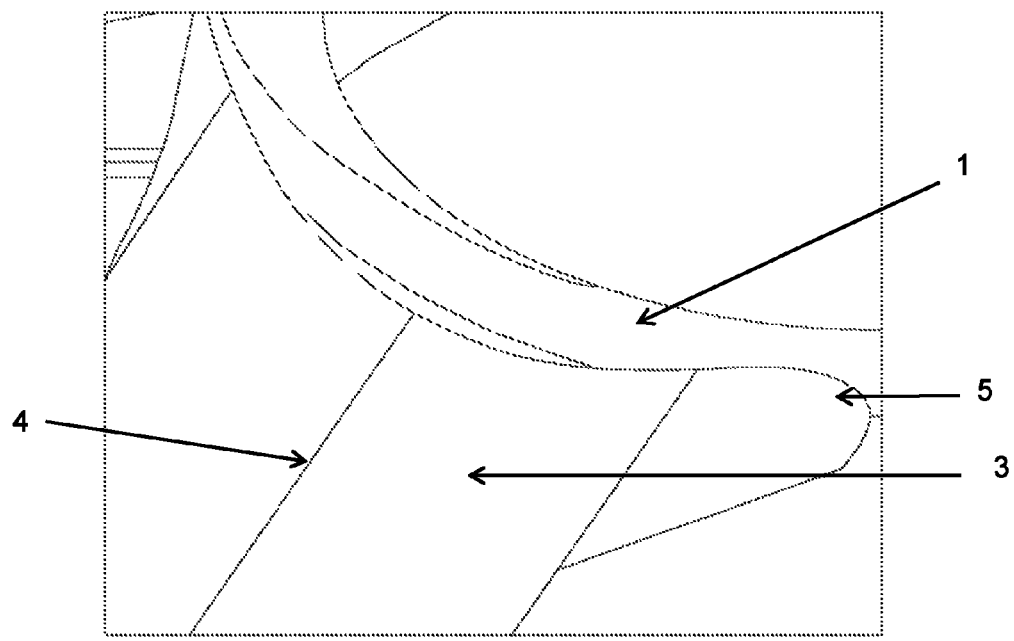
FIGS. 7a and 7b shows a close view of the Stress Relieving Wings (5), of both curved and flat design fitted to the inclined plate/central column connection.
Figure 7B:
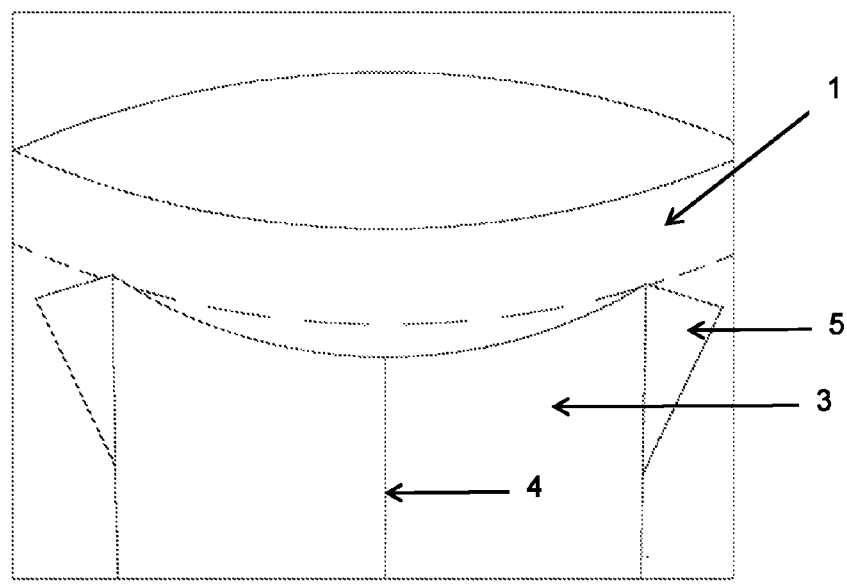
Figure 8:
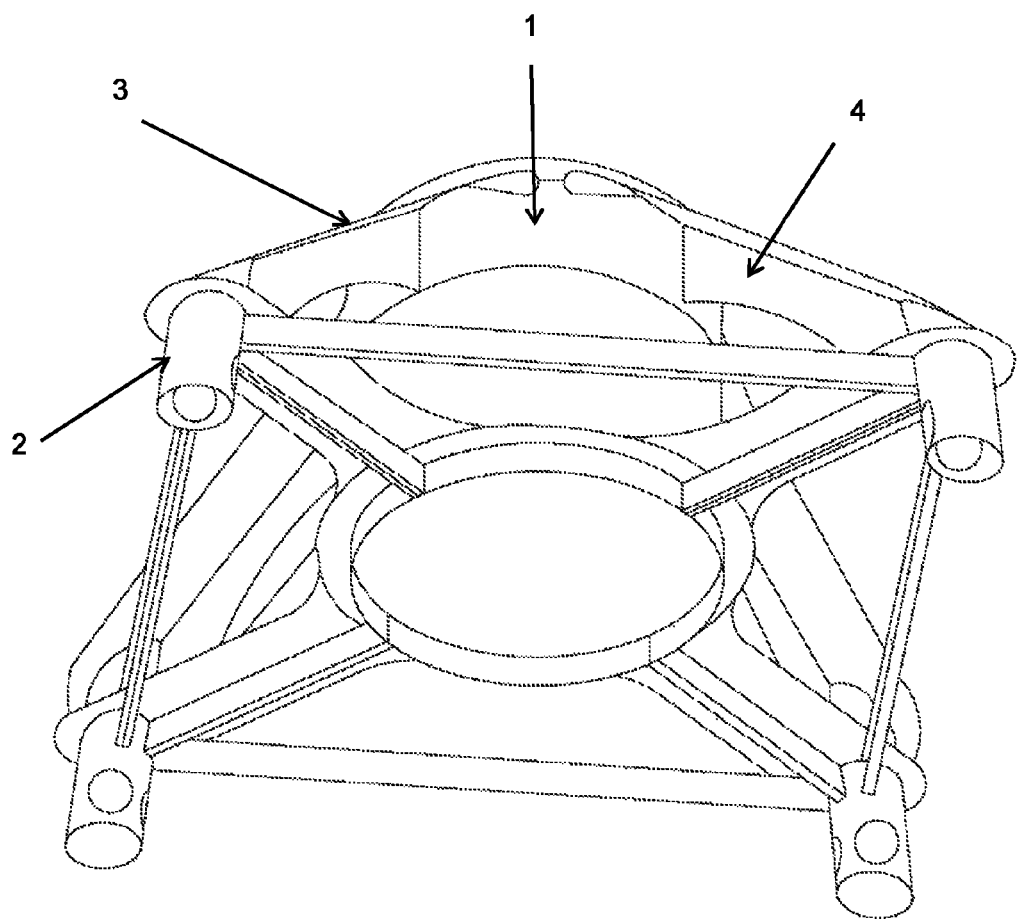
FIG. 8 shows the deck underside of TP assembly with typical beams and plates.

What is claimed is:

1. A plated transition piece assembly comprising a central column connected to a tower base and a jacket, the central column having a curved exterior surface being connected to at least one leg by a shear plate, the shear plate being bounded and connected to an inclined plate thereby enabling load transfer from the central column to the leg or a leg stub, a combination of the inclined plate and the shear plate has a T-shaped cross-section and the inclined plate has a stress relieving wing provided at an upper end of the T-shaped cross-section with termination ends close to a horizontal neutral axis of the T-shaped cross-section, wherein the stress relieving wing engages with and is coupled to the exterior surface of the central column.

2. A plated transition piece assembly according to claim 1, wherein the inclined plate is tapered to meet the leg for providing effective load transfer.

3. A plated transition piece assembly according to claim 1, further including a stress spreader which reduces stress concentrations at points of stress concentration for a connection between the inclined and the central column by spreading the stress concentrations in a larger axis thus enabling a cost effective fatigue design.

4. A plated transition piece according to claim 1, wherein the stress relieving wing is made from one of a cut piece from tubular section, a simple plate, and as an integral part of the inclined plate itself.

5. A plated transition piece according to claim 1, wherein the stress relieving wing is tapered along an axis of a top of the inclined plate to increase a reduction in stress concentration.

6. A plated transition piece assembly according to claim 1, wherein the shear plate includes an opening for facilitating transfer of services and personnel access.

7. A plated transition piece according to claim 6, wherein the opening is fitted with a stress spreader to enable a fatigue resistant and cost effective design.

8. A plated transition piece assembly according to claim 1 whereby torsional loads from the central column are efficiently transferred through to a plurality of legs by an external ring and a combined section of the shear plate and beams connected to the legs and the central column of a transition piece.

9. A plated transition piece assembly according to claim 1, wherein the central column is connected to a plurality of the legs by a plurality of the shear plates, each of the shear plates being bonded and connected to an associated inclined plate thereby enabling load transfer from the central column to the associated leg.

\* \* \* \* \*